June 8, 1937.　　　W. H. PUGSLEY　　　2,083,504
COMBUSTION CONTROL APPARATUS
Filed July 13, 1935　　5 Sheets-Sheet 3
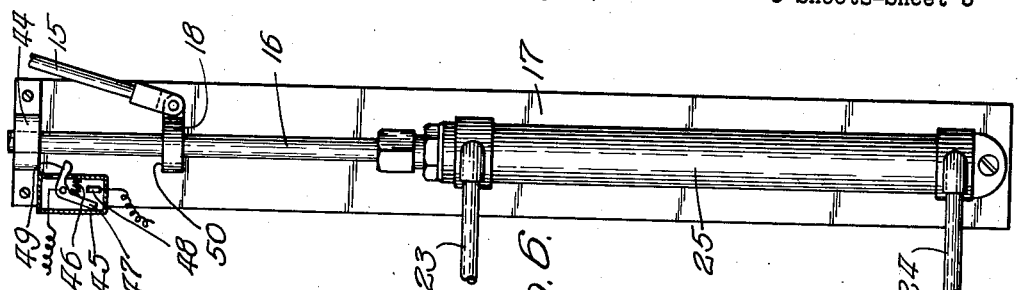
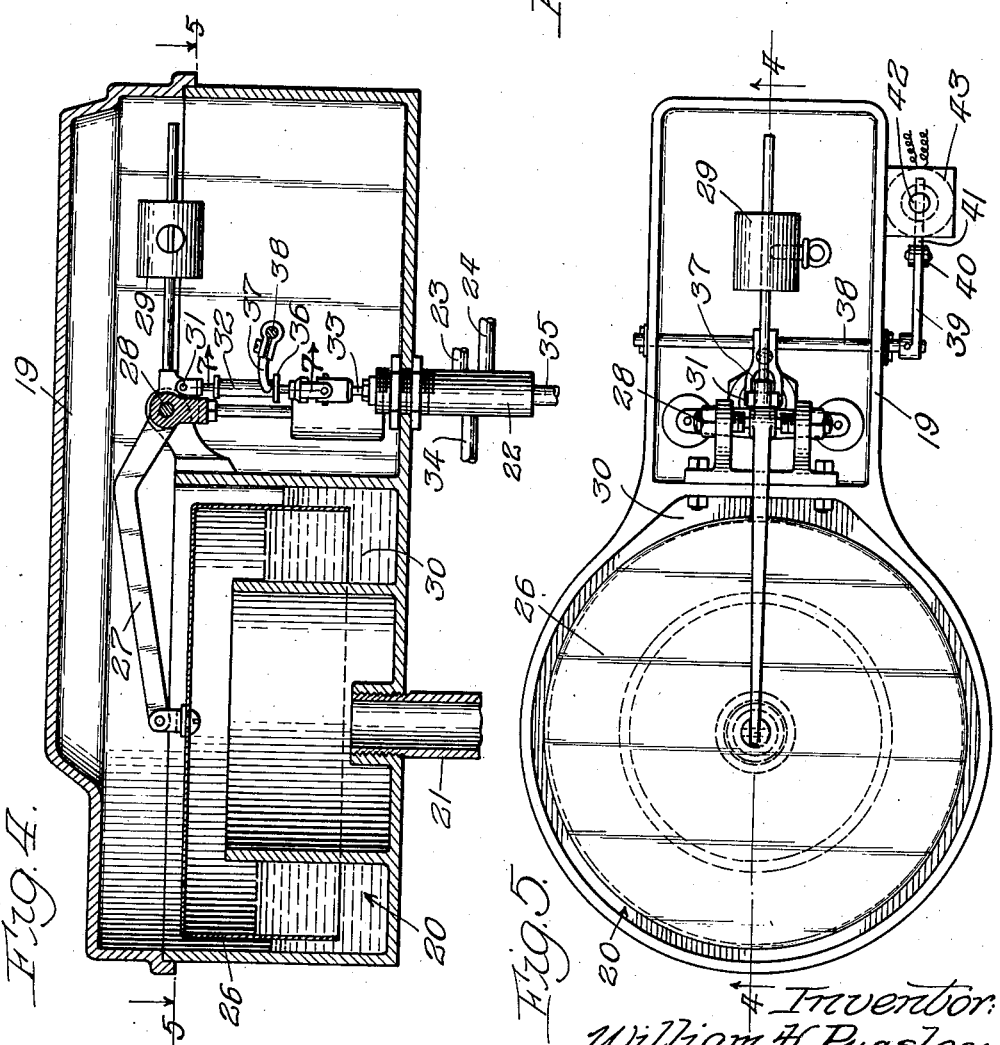

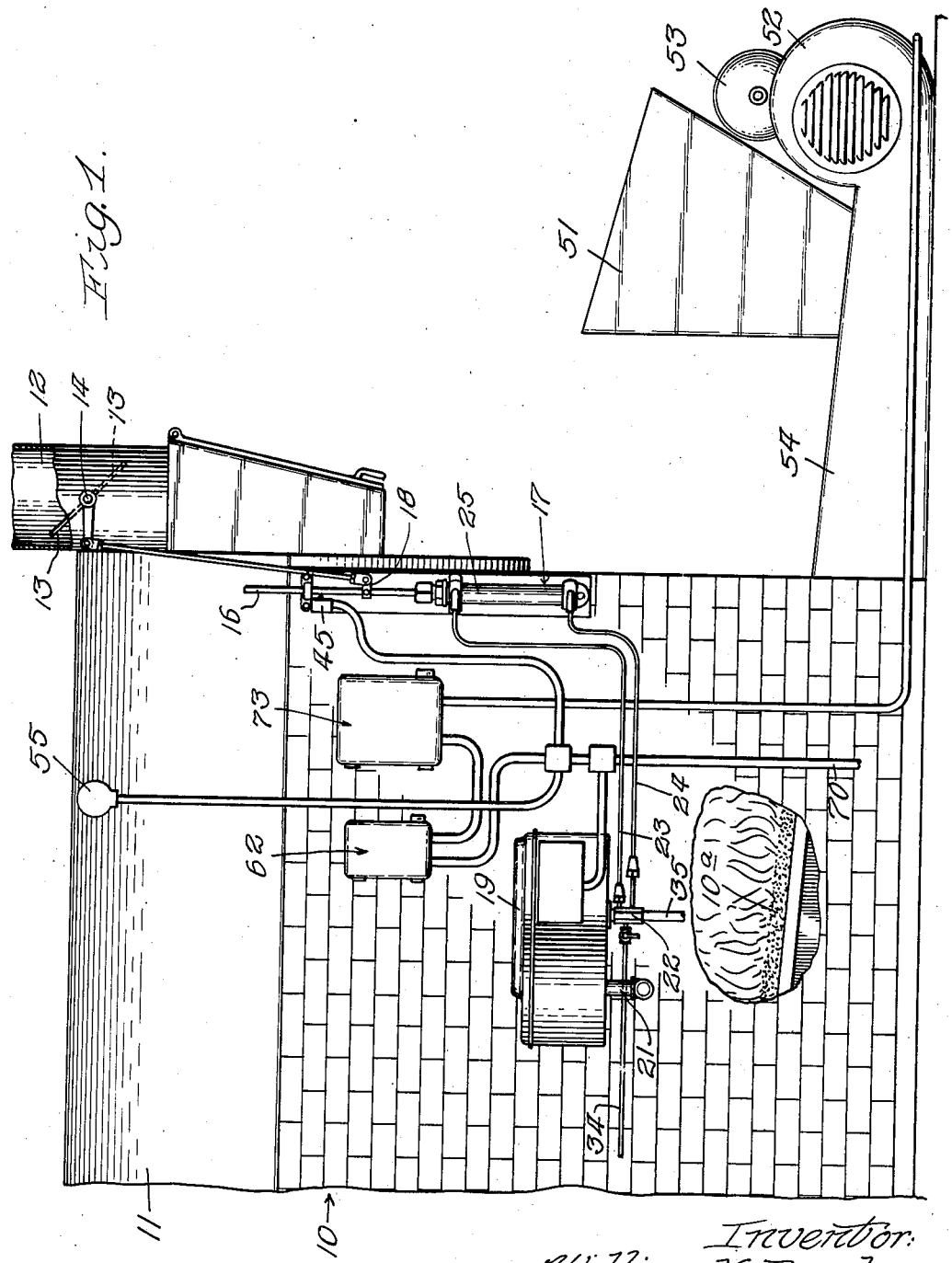

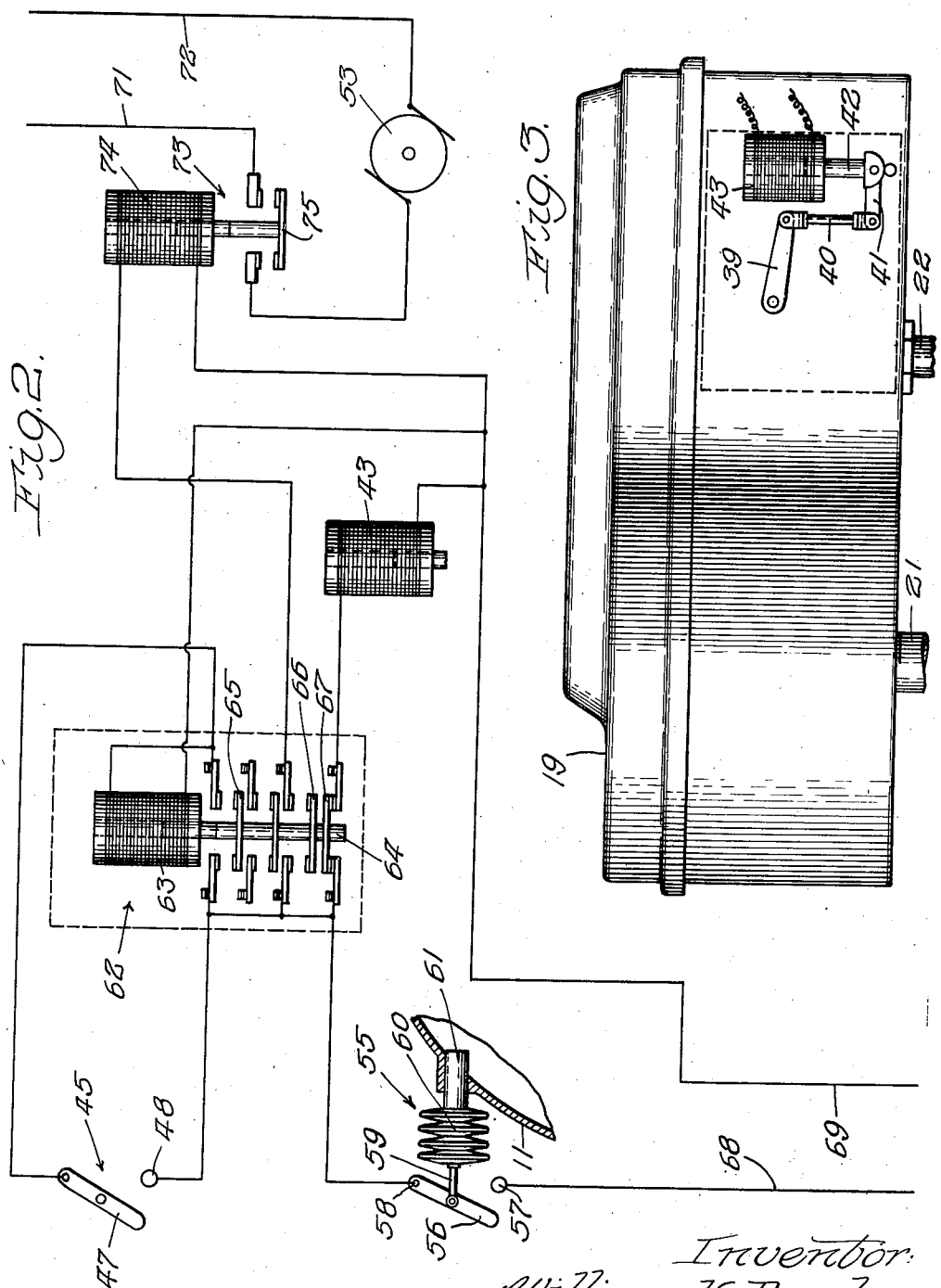

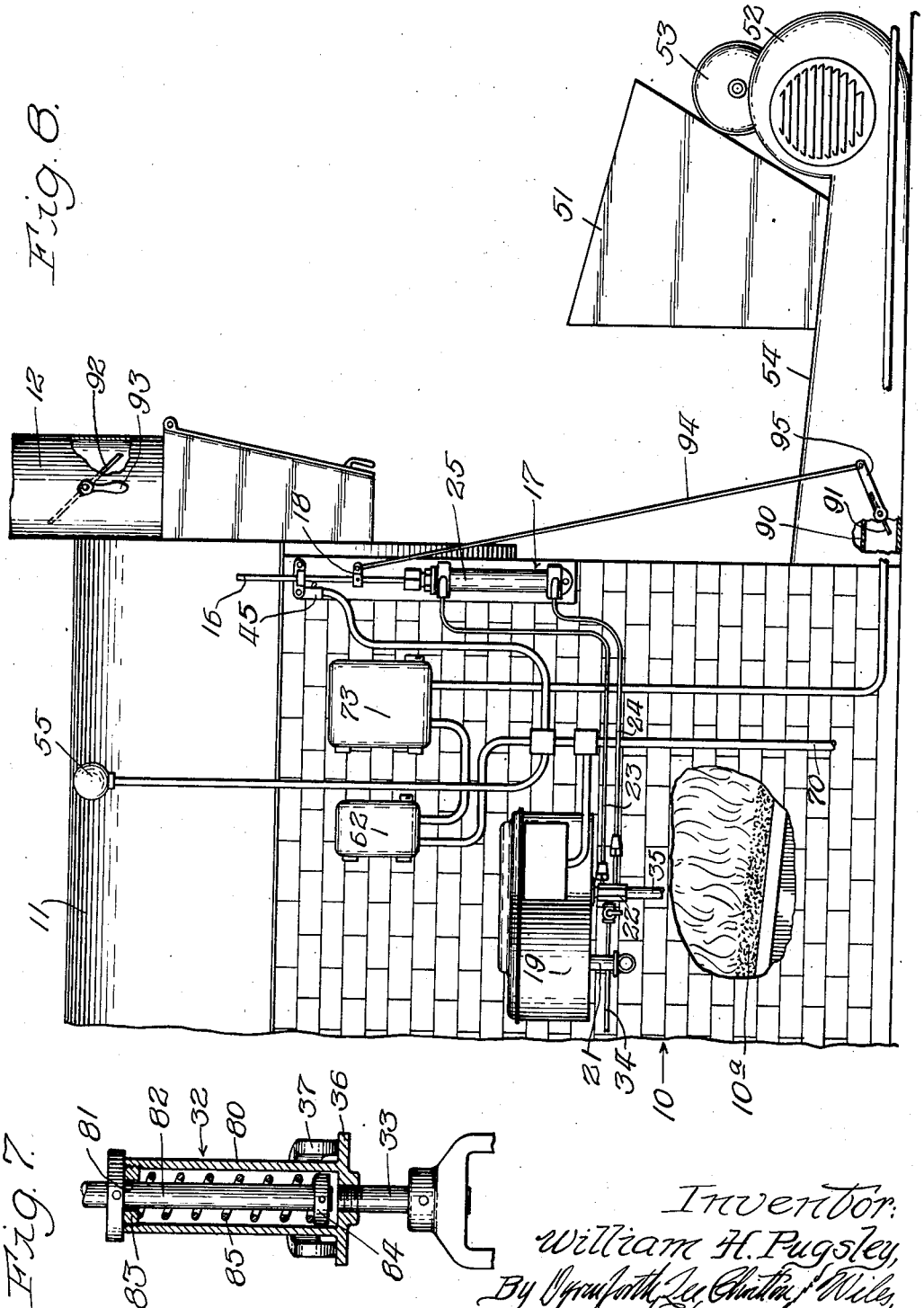

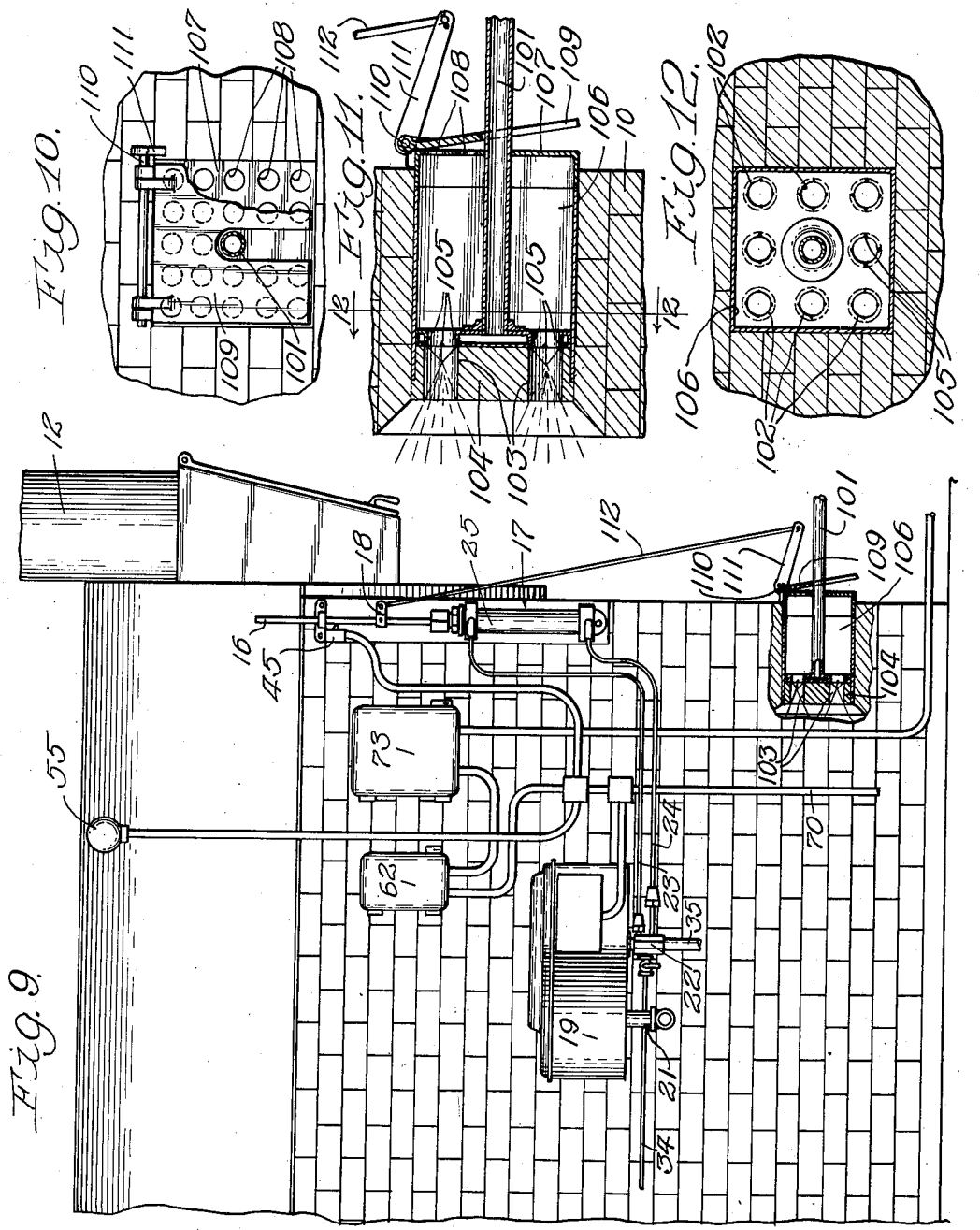

Patented June 8, 1937

2,083,504

UNITED STATES PATENT OFFICE 2,083,504

COMBUSTION CONTROL APPARATUS

William H. Pugsley, Michigan City, Ind., assignor to Carrick Engineering Company, Michigan City, Ind., a corporation of Illinois Application July 13, 1935, Serial No. 31,256

11 Claims. (Cl. 236—15)

This invention relates to combustion control means, and more particularly to such means in combination with a furnace having an intermittent change in the quantity of air flowing therein.

One feature of this invention is that it prevents the formation of objectionable back pressure in the furnace chamber; another feature of this invention is that it insures a good draft at the time of starting of the fuel feed mechanism; yet another feature of this invention is that it prevents a rise in furnace pressure upon a sudden increase in the amount of gas flowing through the combustion chamber of said furnace; still another feature of this invention is that it enables normal draft control during operation of the feed-mechanism; other features and advantages of this invention are apparent from the following specification and the drawings, in which—

Fig. 1 is a vertical elevation of a furnace; Fig. 2 is a schematic diagram of the control circuit; Fig. 3 is a view showing the solenoid in combination with the gasometer; Fig. 4 is a sectional view of the gasometer chamber; Fig. 5 is a sectional view along the lines 5—5 of Fig. 4; Fig. 6 is a detailed view of the damper motor means; Fig. 7 is a detailed sectional view along the line 7—7 of Fig. 4; Fig. 8 is a vertical elevation of a furnace showing a modification of this invention; Fig. 9 is a vertical elevation of a furnace using combustible gas for fuel; Fig. 10 is a view showing the air control means; Fig. 11 is a detailed sectional view of the burner; and Fig. 12 is a view along the line 12—12 of Fig. 11.

Various means for controlling the damper to regulate the draft from the combustion chamber of a furnace in accordance with variations in the pressure of the gases in the furnace have long been known. Where such damper control is used, however, abrupt starting of the feed mechanism, whereby fuel and air either separately or together are fed into the combustion chamber, causes a sudden rise in pressure in the combustion chamber. The normal damper control means, acting comparatively slowly, is not able to instantly open the breeching damper, for example, sufficiently to cause a draft which will neutralize the increase in pressure caused by the feed, and there is thus an objectionable back pressure built up in the combustion chamber. This back pressure frequently causes a burst of flame through the various furnace openings, which is a dangerous and undesirable condition. This invention provides means for overcoming the normal damper control means upon a demand for heat, and of delaying a rush of air into the furnace until the breeching damper, for example, is substantially fully open, thus insuring a strong draft at the moment of increased combustion when the fuel feed starts. This invention, moreover, immediately after starting of the fuel feed and increased air supply, permits the normal damper control means to again assume control and regulate the damper to the point where the desired combustion chamber pressure conditions are obtained.

This invention prevents flame blow-back by regulating the entrance of air into the combustion chamber and the exit of furnace gases therefrom in such a manner as to always keep a proper relation between the two factors. It is desirable to keep the pressure within the combustion chamber slightly lower than the atmospheric pressure without the furnace. Where intermittent forced feed of air is used, for example, the breeching damper must be opened wide before the rush of the increased quantity of air in order to provide sufficient exit for the larger volume of furnace gases. Where there is a continuous forced feed of air, regulated as to volume by a blast gate, the blast gate must be closed, or substantially closed, before fuel is fed to the combustion chamber, in order to prevent too sudden an increase in the volume of furnace gases. Where air is force fed by a multiple speed fan blower and normal control is by a breeching damper, it is necessary to open the damper wide before each increase in blower speed in order to obviate the effects of the increased rush of air. Where gaseous fuel is used and the air feed is by entrainment therewith flame blow-back generally occurs as a result of a sudden increase in the amount of gaseous fuel, since the damper control means regulating the amount of air entrained with the gas generally opens too slowly, and such a damper must, therefore, be opened wide before the increase in gas flow.

In the particular embodiment of this invention illustrated herewith in Figs. 1 to 7 the reference numeral 10 indicates a furnace. This furnace has mounted over the combustion chamber 10ª thereof a boiler 11, whereby the desired vapor is generated. The furnace has in connection therewith a flue 12 within which is a breeching damper 13 pivotally mounted at 14. The damper is connected, by a rod 15, to the guide rod 16 of the hydraulic cylinder or damper motor means 17 by the coupling 18, and controls the quantity of gas flowing through the combustion chamber of the furnace. This gas may comprise air alone, or a mixture of air and the products of combustion.

The furnace has in combination therewith a gasometer chamber 19 having therein a pressure responsive control means or gasometer 20. The gasometer is connected through a pipe 21 to the interior of the furnace, and is thus responsive to variations in the pressure of the gases in the combustion chamber of the furnace 10. The gasometer controls a regulating valve 22, which valve controls the admission of fluid, through the pipes 23 and 24, to the top or bottom of the cylinder 25 of the damper motor means 17. It is thus apparent that variations in the pressure of the gases in the combustion chamber act through the medium of the gasometer and the regulating valve to control the motor means 17, and thereby control the breeching damper and the draft from the furnace to maintain the pressure within the combustion chamber at the desired level or gradient with respect to outside atmospheric pressure. The construction and operation of the particular valve and damper motor means disclosed herein are more particularly described in Patent No. 1,520,530 issued to Gerald S. Carrick.

Considering more particularly Figs. 4 and 5, the gasometer 20, the particular pressure responsive means disclosed herein, comprises an inverted bell or dome 26 suspended from the lever 27, which lever is pivoted at 28 and has an adjustable counterbalancing weight 29. The bell 26 is sealed at its lower end in a liquid seal provided by the chamber 30, and its interior is open to the pressure existing within the combustion chamber, which pressure is communicated thereto by the pipe 21. The lever 27 has attached thereto at the point 31 a spring connection or lost motion link 32, which link is connected to the plunger 33, which controls the operation of the regulating valve 22. This valve is supplied with liquid under pressure through the pipe 34, and has a discharge outlet at 35. The plunger 33 has thereon an annular ring 36, which ring has associated therewith a pair of fingers or fork 37, which fork is carried by the transversely rotatable rod 38, which rod here projects without the casing 19. The rod 38 has extending therefrom an arm 39, which arm is coupled by the links 40 and 41 to the core 42 of a solenoid 43.

The operation of the lost motion link 32 may be readily understood from an examination of Fig. 7. The plunger 33 and annular ring 36 are rigidly connected to a tube 80, having a washer 83 threaded into the top thereof, said washer having an opening 81 therethrough, which opening is adapted to slidably receive a rod 82. This rod has a shoulder 84 at the bottom thereof, which shoulder is adapted to form a seat for the lower end of the helical spring 85. The spring surrounds the rod 82 and at its upper end engages the washer 83, thus making a yielding coupling between the plunger 33 and the rod 82. The spring 85 is placed under sufficient tension to overcome the resistance of the plunger 33 in its operation of the valve 22, and therefore during normal operation movement of the gasometer effects a corresponding movement of the valve plunger 33 as though it were rigidly coupled thereto. When the solenoid 43 is energized, however, the fork 37 in contact with the annular ring 36 overcomes the tension of the spring 85 and depresses the plunger 33 regardless of the position of the gasometer.

The damper motor means 17 has extending therefrom a guide rod 16, which guide rod passes through a bearing 44 which marks the upward limit of movement of the coupling 18. Immediately adjacent this bearing a limit switch 45 is provided. The switch 45 is so arranged that a spring 46 keeps the contacts 47 and 48 normally separated. A projection or arm 49 on the contact 47 is adapted to cooperate with the shoulder 50 on the coupling 18, so that when the coupling 18 is substantially at its highest position the contacts 47 and 48 are closed thereby. The rod 15, which connects the coupling 18 to the damper 13, is so arranged that when the coupling 18 causes the switch 45 to close its contacts the damper 13 is substantially fully open.

In the particular embodiment of the device illustrated herewith, the furnace 10 has associated therewith a hopper 51 in which coal is placed. The hopper has adjacent thereto a blower 52, which blower is driven by an electric motor or other means 53. The combustion chamber of the furnace 10 is fed, through the housing 54, with coal by a mechanical stoker mechanism and with air to support the combustion when the electric motor 53 is in operation. It is readily apparent that any solid, liquid, or gaseous fuel capable of being intermittently fed to the furnace by automatic means, in combination with air, might be used in place of coal.

Within the boiler 11 is located a heat demand means, or pressure switch 55, which switch is opened or closed in response to changes in the vapor pressure existing within the boiler. It is to be understood that any other desired heat demand means may be used to render the system operative, as for example a room thermostat. This switch 55 comprises a pair of contact members 56 and 57, one of which contacts is pivotally mounted, as at 58, and attached by a rod 59 to a metal bellows 60, which metal bellows opens to the interior of the boiler 11 through the opening 61. A relay 62 is here shown as a four-pole relay, of a common type commercially used, although only three poles are used in this hookup, and any three-pole relay having two poles normally open and one pole normally closed would be equally efficient herein. The relay 62 includes a solenoid 63, which solenoid, when energized, draws in the bar 64, thus causing the poles 65 and 66 to close their contacts, and the pole 67 to break its contacts. Current for the operation of the electrical system is supplied by the lines 68 and 69, which lines are brought in through the pipe 70. Lines 71 and 72 supply the load current for the electric motor 53. Starting means for the motor 53 is here illustrated as a relay 73 having a solenoid 74 adapted to close the circuit to the motor through drawing up a pole 75. Where a heavy duty motor is used, however, a starting box would be necessary in the line 71, and the solenoid 74 could then be replaced by the control solenoid in the starting relay box. Requisite overload protection in the form of relays or fuses may also be inserted in the motor circuit.

Assuming the demand switch 55 to be open, no fuel or air is being positively fed to the combustion chamber through the duct 54. Regulation of the draft, through the medium of the damper 13, is controlled through the damper motor means 17, which motor means responds to movements of the gasometer in accordance with variations in the pressure of the gases within the combustion chamber. As soon as the steam pressure in the boiler 11 drops to the desired minimum, the contacts 56 and 57 close and the solenoid 43 is energized, since the relay pole 67 is normally closed. Energization of the solenoid 43 draws up within it the core 42, which alters the position of the rod 38 and causes the fork 37 to depress the valve member 33, regardless of the position of the gasometer dome 26, since the solenoid is designed to have a pull more than sufficient to overcome the spring 85 in the connecting link 32. Depressing the valve member 33 causes fluid to flow through the pipe 24 and raise the rod 16, which thus starts to open the damper 13. When the rod 16 has reached substantially the upper limit of its travel, the shoulder 50 closes the contacts 47 and 48 of the limit switch 45. Closing of these contacts energizes the solenoid 63 of the relay 62, which thereupon draws up the bar 64 and causes the poles 65 and 66 to make contact, and the pole 67 to break contact. Closing of the pole 65 provides a holding circuit for the relay which maintains the solenoid 63 energized as long as the demand switch contacts 56 and 57 are closed, regardless of whether or not the limit switch contacts 47 and 48 remain closed. Closing the contacts of the pole 66 energizes the solenoid 74, which either directly or through the medium of a starting box, causes the electric motor 53 to be energized, whereupon fuel and air are positively fed to the combustion chamber through the housing 54. As soon as the pole 67 broke contact, however, the solenoid 43 was de-energized, and control of the damper motor means 17 was thus restored to the gasometer. As soon as this normal control is restored the damper 13 starts to close from its fully open position, and gradually assumes a position which establishes a draft sufficient to maintain the desired pressure of gases within the combustion chamber of the furnace. As soon as the positively fed combustion has raised the steam pressure within the boiler 11 to the desired point, the pressure switch or demand switch 55 will open its contacts 56 and 57. The electrical control system will thereupon be rendered inoperative, since no current is supplied thereto from the lines 68 and 69, and the relay 62 will return to its normal position wherein the poles 65 and 66 are open and the pole 67 closed. Opening of the pole 66 de-energizes the motor control solenoid 74 and causes the operation of the motor 53 to cease, with the consequent cessation of the fuel and air feed through the duct 54. The entire system will then be in condition to repeat the above described sequence whenever the pressure of the steam in the boiler 11 causes the switch 55 to close its contacts, thus making a demand for heat.

That the advantages of this invention may be realized in connection with furnaces using other than breeching damper control means will be apparent from reference to Fig. 8, wherein blast gate control is illustrated, and Figs. 9 to 12, wherein the use of gaseous fuel with a regulated natural draft is illustrated. The parts of the furnace and associated mechanism which are similar to and perform the same functions as corresponding parts in the embodiment of this invention illustated in Figs. 1 to 7 have been given the same reference numerals.

Referring more particularly to Fig. 8, a furnace 10 is illustrated having a combustion chamber 10a fed with coal from the hopper 51 by appropriate stoker feed means within the housing 54. The blower 52 supplies air to the combustion chamber through the duct 90 also located within the housing 54. The duct 90 is provided with a damper or blast gate 91 which serves to regulate the amount of air supplied to the combustion chamber by its position within the duct. In this particular embodiment of the invention the breeching damper 92 is manually controlled, as by the handle 93, and normal automatic regulation of the rate of combustion is achieved through movement in the position of the blast gate 91. The damper motor means 17 has its coupling 18 connected, as by a rod 94, to an arm or lever 95 regulating the position of the blast 91. The gasometer within the gasometer chamber 19, operating through the valve 22 and the damper motor means 17, serves to regulate the position of the blast gate by, and in accordance with, the changes in the pressure within the combustion chamber of the furnace 10. This normal control is operative either when a natural draft is being used or when air is being forced to the combustion chamber as by the blower feed means 52. The demand means 55, also illustrated here as a pressure responsive switch, serves to call for an increased quantity of air or of fuel, or of both, when the steam pressure within the boiler 11 falls to the minimum desired. It will be apparent that an increase in the quantity of fuel fed to the combustion chamber, or an increase of the amount of air flowing through the duct 90 to the combustion chamber, which increase in the quantity of air may be either from initiation of forced air fed or from an increase in the blower's speed where a multi-speed blower is used, will cause a rise of pressure within the combustion chamber, which rise is undesirable if excessive. Upon such a demand for heat from the means 55, the electrical control system housed in the units 62 and 73, which has been described heretofore in connection with the embodiment illustrated in Figs. 1 to 7, serves to take control away from the gasometer 19 and to cause the damper motor means 17 to lift the coupling 18 to its highest position, whereby the blast gate 91 serves to substantially close the duct 90, before the limit switch 45 is tripped to enable the desired operation of the feed means to increase combustion. As soon as the limit switch is tripped normal control is again restored to the gasometer and it operates through the valve 22 and the damper motor means 17 to return the blast gate 91 to the position for optimum pressure conditions within the combustion chamber 10a. An excessive rise in pressure within the combustion chamber may thus be obviated through the use of this invention in connection with furnaces having blast gate control of the rate of combustion.

Referring more particularly to Figs. 9 to 12, the furnace 10 is illustrated as being fed with a gaseous fuel through the supply pipe 101. The supply pipe feeds the gaseous fuel to a set of annular burners 102 lying in openings 103 in the fire resistant material 104. The annular burners are provided with small openings 105 spaced about the circumference thereof and so directed as to cause the gaseous fuel to issue in a jet within the openings 103. The burners are placed within a chamber 106 in the brick 107 forming the wall of the furnace. The front of the chamber 106 is covered with a plate 107 having openings 108 therethrough. These openings furnish access for the air necessary to support the combustion of the gaseous fuel within the furnace 10, which air passes through said openings as the result of the natural draft in the furnace, and of entrainment with the gaseous fuel fed through the supply pipe 101. Control of the quantity of air entering the chamber 106 is achieved through the damper 109, which damper may be pivotally mounted as at 110. The damper 109 is here illustrated as being provided with an arm 111 connected by the rod 112 to the coupling 18 on the guide rod 16 of the damper motor means 17. Gaseous fuel is fed through the supply pipe or feed means 101 and the quantity thereof is controlled by any conventional means which form no part of the present invention and are not here illustrated. The gasometer, operating by and in accordance with changes in pressure within the furnace 10, operates through the valve 22 and the damper motor means 17 to regulate the position of the damper 109 to secure the proper amount of air feed. Upon a demand for heat, as by the means 55, the electrical system housed in the units 62 and 73 and described in connection with the embodiment of this invention illustrated in Figs. 1 to 7, takes control away from the gasometer and causes the damper 109 to open wide before the limit switch 45 is tripped to secure an increase in the quantity of gaseous fuel and to restore control of the damper position to the normal means. Opening the damper wide prior to an increase in the quantity of fuel or to initiation of the fuel feed insures sufficient air to prevent building up of a quantity of unburned gaseous fuel within the furnace 10 which might result in an explosion or blow-back.

While I have shown and described certain embodiments of my invention it is to be understood that it is capable of many modifications. Changes, therefore, in the construction and arrangement may be made without departing from the spirit and scope of the invention as disclosed in the appended claims in which it is my intention to claim all novelty inherent in my invention as broadly as permissible in view of the prior art.

What I regard as new and desire to secure by Letters Patent is:

1. A device of the character described, including: a furnace having a combustion chamber therein; means for normally maintaining a substantially constant pressure in said combustion chamber, said means including a damper; feed means adapted to positively feed fuel and air to said combustion chamber; demand means; means connected to said demand means for initiating operation of said feed means, said connected means including means for moving said damper prior to rendering said feed means operative, whereby the initial operation of said feed means will not cause an abnormal increase of pressure in the combustion chamber.

2. A device of the character described, including: a furnace having a combustion chamber therein; means for normally controlling the discharge of gases from said chamber by and in accordance with changes in a furnace variable, said means including a damper; means for positively feeding air to said chamber; and demand means for rendering said air feed means operative, said demand means including means for opening said damper prior to initiating an increased air feed, but allowing said damper to be normally controlled substantially immediately thereafter.

3. A device of the character described, including: a furnace having a combustion chamber therein; means for normally controlling the discharge of gases from said chamber by and in accordance with the changes in the pressure of gases in the chamber, said means including a damper; means for positively feeding air to said chamber; demand means adapted to control the air feed means, said demand means operating to open the damper upon a demand for air; and means operated by opening movement of said damper when substantially fully opened for rendering said demand means inoperative to control the damper, whereby said damper is normally controlled substantially immediately thereafter, and operative to control the air feed means.

4. A device of the character described, including: a furnace having a combustion chamber therein; means for normally controlling the discharge of gases from said chamber by and in accordance with the changes in the pressure of gases in the chamber, said means including a damper; means for positively feeding fuel and air to said chamber; demand means, responsive to changes in a furnace variable, adapted to control the fuel and air feed means, said demand means operating to open the damper upon a demand for air; and means operated by opening movement of said damper when substantially fully opened for rendering said demand means inoperative to control the damper and operative to control the air feed means, said damper being normally controlled substantially immediately thereafter.

5. A device of the character described, including: a furnace having a combustion chamber therein; a damper; motor means for operating said damper; means for normally controlling said motor means by and in accordance with changes in the pressure of the gases in the chamber; means for positively feeding fuel and air to said chamber; heat demand means, said means being responsive to changes in a furnace variable; means whereby, upon a demand for heat, the normal control means for the damper is rendered inoperative and said motor means opens said damper; and means whereby, when said damper is substantially fully open, said feed means is rendered operative and said means for normally controlling said motor means is again rendered operative substantially immediately thereafter.

6. A device of the character described, including: a furnace having a combustion chamber therein; a damper; motor means for operating said damper; means for normally controlling said motor means by and in accordance with changes in the pressure of the gases in the chamber; means for positively feeding fuel and air to said chamber; heat demand means, said means being responsive to changes in a furnace variable; means whereby, upon a demand for heat, said normal control means is overcome to open said damper; and relay means whereby, when said damper is substantially fully open, said feed means is rendered operative and said means for normally controlling said motor means is again rendered operative.

7. A device of the character described, including: a furnace having a combustion chamber therein; a damper; motor means for operating said damper; a gasometer for normally controlling said motor means by and in accordance with changes in the pressure of the gases in the chamber; means for positively feeding fuel and air to said chamber; heat demand means, said means being responsive to changes in steam pressure in said furnace; means whereby, upon a demand for heat, said gasometer is overcome by the pull of a solenoid to open said damper; and relay means whereby, when said damper is substantially fully open, said feed means is rendered operative and said solenoid is rendered inoperative.

8. A device of the character described, including: a furnace having a combustion chamber therein; a blast gate; motor means for operating said blast gate; a gasometer for normally controlling said motor means by and in accordance with changes in the pressure of gases in the chamber; means for positively feeding fuel and air to said chamber; heat demand means, said means being responsive to changes in steam pressure in said furnace; means whereby upon a demand for heat, said gasometer is overcome by the pull of a solenoid to substantially close said blast gate, and relay means whereby, when said blast gate is substantially closed, said feed means is rendered operative and said solenoid is rendered inoperative.

9. A device of the character described including: a furnace having a combustion chamber therein; means for normally controlling the admittance of air to said chamber by and in accordance with changes in a furnace variable, said means including a damper; means for positively feeding fuel and air to said chamber; and demand means for rendering said feed means operative, said demand means including means for opening said damper prior to initiating operation of said feed means but allowing said damper to be normally controlled substantially immediately thereafter.

10. A device of the character described, including: a furnace having a combustion chamber therein; means for normally controlling the admittance of air to said chamber by and in accordance with the changes in the pressure of gases in the chamber, said means including a damper; means for positively feeding fuel and air to said chamber; heat demand means adapted to control the fuel feed means, said demand means operating upon the damper upon a demand for heat; and means operated by opening movement of said damper when substantially fully opened for rendering said demand means inoperative to control the damper and operative to control the fuel feed means, whereby the amount of gaseous fuel feed to said chamber is increased and said damper is again normally controlled substantially immediately thereafter.

11. A device of the character described, including: a furnace having a combustion chamber; a damper; motor means for operating said damper; means for normally controlling said motor means by and in accordance with changes in the pressure of the gases in the chamber; heat demand means, said means being responsive to changes in a furnace variable; a second motor means whereby, upon a demand for heat, said normal control means is overcome to open said damper; and means whereby when said damper is substantially fully open, said feed means is rendered operative, said second motor means is rendered inoperative, and said normal control means again operative substantially immediately thereafter.

WILLIAM H. PUGSLEY.